United States Patent

Camiciottoli et al.

[15] 3,692,964

[45] Sept. 19, 1972

[54] REMOTE-TESTING ARRANGEMENT FOR TWO-WAY TRANSMISSION CHANNEL OF PCM TELECOMMUNICATION SYSTEM

[72] Inventors: Roberto Camiciottoli; Maurizio Palombari, both of Milan, Italy

[73] Assignee: Societa Italiana Telecommunicazioni S.p.A., Milan, Italy

[22] Filed: Dec. 21, 1970

[21] Appl. No.: 99,855

[30] Foreign Application Priority Data

Dec. 24, 1969 Italy....................26303 A/69

[52] U.S. Cl. .......................................179/175.31 R

[51] Int. Cl. ...........................................H04b 3/46

[58] Field of Search................179/175.31 R; 325/55

[56] References Cited

UNITED STATES PATENTS

| | | | |
|---|---|---|---|
| 3,458,661 | 7/1969 | Forde et al. | ........179/175.31 R |
| 3,510,777 | 5/1970 | Gordon | .......................325/55 |
| 2,315,435 | 3/1943 | Leibe | ................179/175.31 R |
| 3,519,935 | 7/1970 | Hochgraf | ..........179/175.31 R |
| 3,586,968 | 6/1971 | Barjot | ...............179/175.31 R |

*Primary Examiner*—Kathleen H. Claffy
*Assistant Examiner*—Douglas W. Olms
*Attorney*—Karl F. Ross

[57] ABSTRACT

To test several repeaters in a two-way transmission channel designed for pulse-code-modulation message signals, an identification code individual to a given repeater is sent out from a terminal station over one signal path and is picked up by a decoder at that repeater which, in response to several recurrences of the same code, closes a loop through the other signal path for feeding the code back to the originating station. The identification code is inserted four times in a binary sequency, sandwiched between guard codes of first-order and second-order periodicity to limit the possibility of accidental formation within the sequence of a code assigned to a different repeater.

9 Claims, 5 Drawing Figures

INVENTORS:
R. Camiciottoli
M. Palombari

BY

Karl G. Ross
Attorney

R. Camiciottoli
M. Palombari
INVENTORS.

BY

Karl F. Ross
Attorney

PATENTED SEP 19 1972 3,692,964

SHEET 3 OF 4

R. Camiciottoli
M. Palombari
INVENTORS.

BY

Karl F. Ross
Attorney

REMOTE-TESTING ARRANGEMENT FOR TWO-WAY TRANSMISSION CHANNEL OF PCM TELECOMMUNICATION SYSTEM

Our present invention relates to a remote-testing arrangement for a two-way transmission channel designed for the exchange of pulse-code-modulation (PCM) signals between two terminal stations over an outgoing and an incoming path including a number of repeater stations.

In order to test the performance of each repeater, various methods have been developed for individually addressing such repeater by a signal emitted from a terminal station and sent back to the same or the opposite terminal station by the repeater if the latter operates properly. Such methods have heretofore utilized either a special signal path, a direct-current supply line, or a low-frequency band of the PCM channel. The drawbacks of these prior systems include the limited available bandwidth, which restricts the number of repeater stations and channel sections that can be tested, and in some cases the need for the intervention of operators at both terminal stations in order to test the continuity of the channel in both directions.

The general object of our invention is to provide an improved remote-testing arrangement for the purpose set forth which avoids the aforestated disadvantages and utilizes to the fullest extent the available transmission capacity of the PCM system.

A more specific object is to provide means in such system for enabling an operator at a single terminal station to ascertain both the integrity of any number of sections of the outgoing and imcoming signal paths, which may consist of metallic circuits and/or radio links, and the proper functioning of all the intervening repeaters.

These objects are realized, pursuant to the present invention, by the provision of a pulse generator at the local station where testing is to be carried out, this pulse generator serving for the iterative transmission of a predetermined sequence of bits over one path of the channel; a decoder at a repeater station, recognizing an identification code in that sequence individual to this particular repeater, causes the operation of switches at that repeater station for completing a loop through the amplifiers thereof back to the local station by way of the other signal path of the channel to feed back a recurrence of the aforementioned pulse sequence. At the local station, a detector connected to that other path and suitably preset by a manually (or possibly automatically) operable code selector recognizes the returning identification code and actuates an indicator in response thereto, thus signaling the proper functioning of the tested channel section.

According to a more specific feature of our invention, designed to serve a telecommunication system with a large number of repeater stations on the same channel, the selector associated with the pulse generator at the local station is designed to establish a multiplicity of different identification codes of $n$ bits each, $n$ being an integer greater than 1; the pulse generator includes a programmer which effectively inserts the selected multidigit identification code into the outgoing pulse sequence with intervening guard codes, also of the multi-digit type, which are mutually different but of invariable character. These guard codes, designed to reduce the possibility of accidental generation within the pulse sequence of a code identifying another repeater station, advantageously consist each of a multiplicity of recurrences of elemental codes of not more than $m$ bits, with $m$ substantially smaller than $n$. In practice, $m$ may be equal to 2, which provides four distinct guard codes of first-order and second-order periodicity (000..., 111..., 101010..., 010101...).

The interleaving of these guard codes with the recurrent identification code, which may thus be repeated $2^m$ times in a single outgoing pulse sequency, prevents other $n$-digit codes assigned to different repeaters from occurring more than once in each sequence, provided certain combinations of bits closely related to the selected code are excluded as will be described in detail hereinafter. The decoder at any repeater station, and preferably also the code detector at the local station, may then be designed to ignore a single occurrence of the assigned or selected code and to actuate the loop-closing switches or the local continuity indicator only in response to a repeated appearance of that code at a rate corresponding to its rate of recurrence in the generated pulse sequence.

The above and other features of our invention will be described in detail hereinafter with reference to the accompanying drawing in which.

Figure 1:
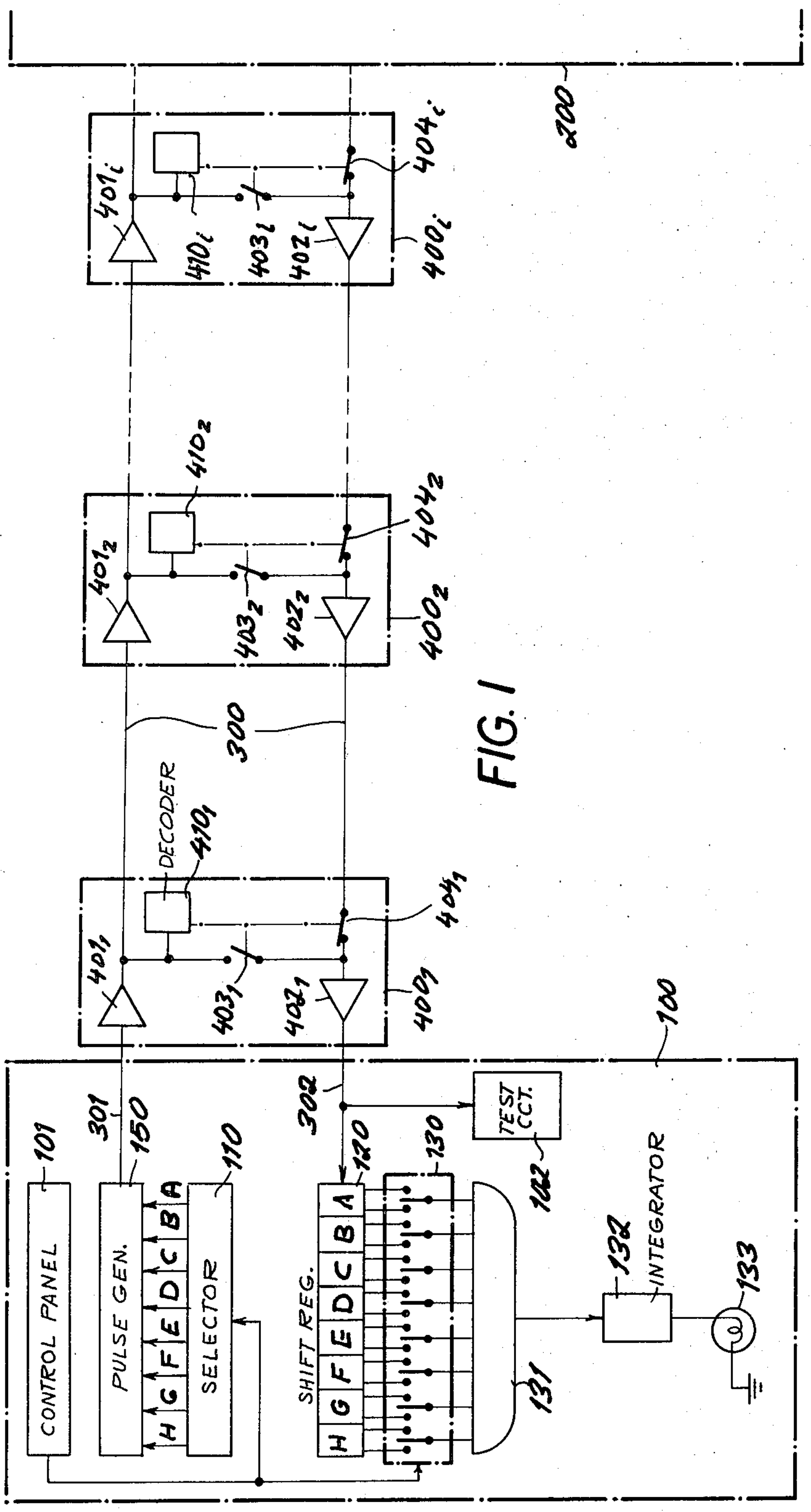
FIG. 1 is a block diagram of an overall telecommunication system embodying a remote-testing arrangement according to our invention.

FIG. 1 broadly shows a first terminal station 100 and a remote second terminal station 200 interconnected by a PCM telecommunication channel 300 through the intermediary of several repeater stations $400_1$, $400_2$, ... $400_i$. Channel 300 includes an outgoing path 301 and an incoming path 302 (as viewed from terminal station 100), the several repeater stations having amplifiers $401_1$, $401_2$. ... $401_i$ inserted in path 301 and amplifiers $402_1$, $402_2$, ... $402_i$ inserted in path 302.

Local station 100 comprises a selector 110 with eight stages, designated A – H, controlling a pulse generator 150 which works into outgoing signal path 301. Incoming path 302 energizes an eight-stage shift register 120 whose stage outputs are selectively connected through a multiple switch 130 (which may be generally similar to selector 110) to an AND gate 131 feeding an integrator 132 for the energization of an indicator 133 diagrammatically shown as a signal lamp. Selector 110 and switch 130 are jointly settable, by a local operator, with the aid of a control panel 101. A test circuit 102 connected to incoming signal path 302 compares the signal level on that path with a standard to determine the transmission characteristics of a line segment undergoing checking.

Each repeater station $400_1$ etc. (and, if desired, also the remote station 200) comprises a decoder $410_1$, $410_2$, ... $410_i$ connected to signal path 301 downstream of the corresponding amplifier 401 etc. and controlling a pair of electronic switches $403_1$, $403_2$, ... $403_i$ and $404_1$, $404_2$, ... $404_i$ serving to complete a loop back to station 100 via the associated amplifier $402_1$ etc. and to open the signal path 302 upstream of that amplifier. Thus, a pulse sequence PS (FIG. 3) emitted by generator 150 and reaching the decoder $410_i$ of the repeater station $400_i$, addressed by an identification code in that sequence, completes a loop through all the line segments between the selected repeater and the preceding repeater stations $400_1$, $400_2$ etc. to provide a test for the continuity of all these line segments, or of the last segment if the preceding ones (up to and including the repeater immediately ahead of station $400_i$) have already been checked.

The periodic emission of the pulse sequence PS by generator 150 eventually actuates the comparison circuit represented by shift register 120 and multiple switch 130 to trigger the indicator 133 in response to the recurrent arrival of the emitted identification code via signal path 302. The purpose of integrator 132 is to prevent a response of indicator 133 to a fortuitous and isolated occurrence of the selected code in a train of incoming message pulses; thus, the time constant of integrator 333 is consistent with the recurrence rate of the identification code in the outgoing pulse sequence so as to prevent any operation of indicator 133 unless the code is repeated a number of times at a rate at least equal to its recurrence rate or cadence in the output of pulse generator 150.

Figure 2:
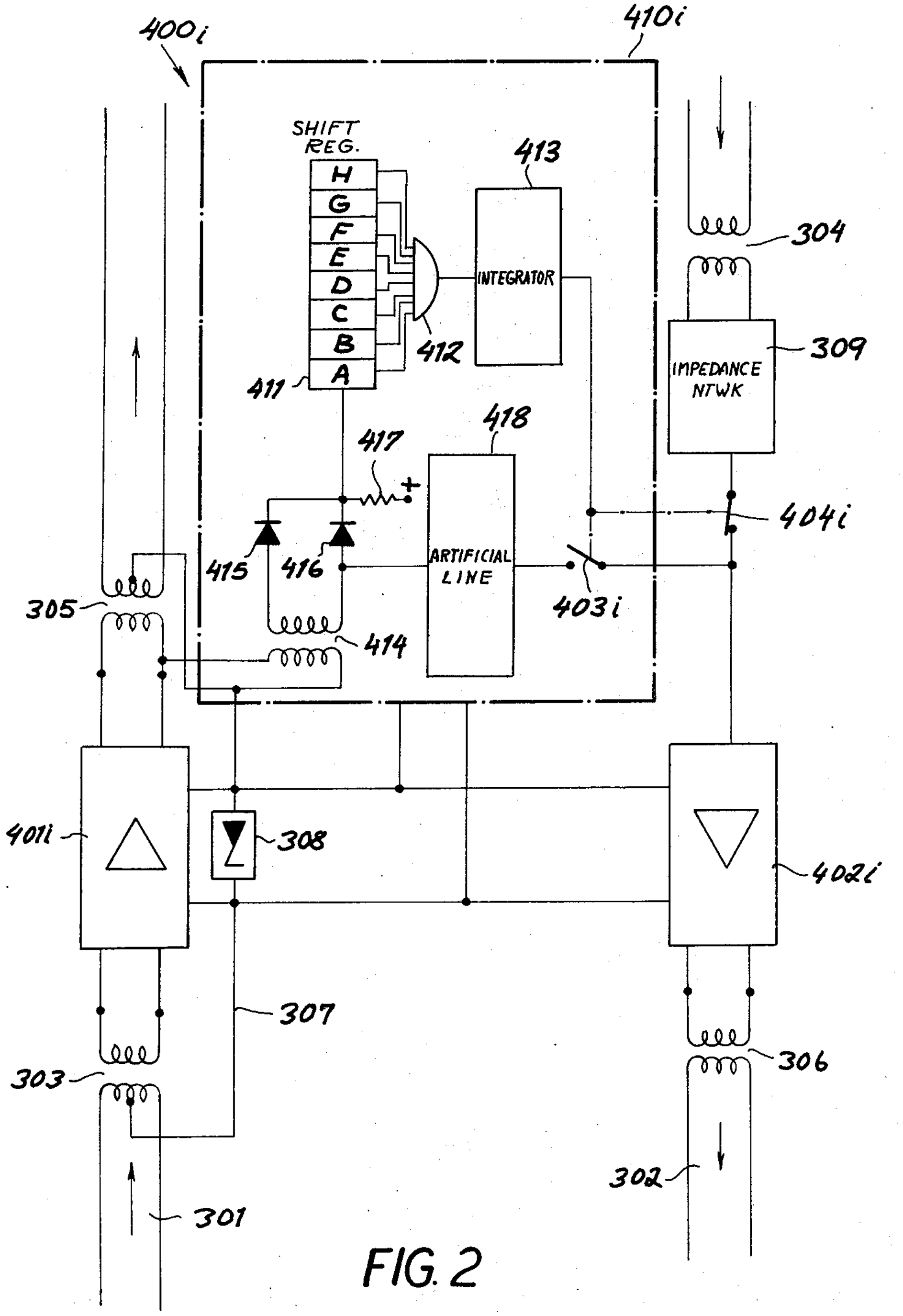
FIG. 2 is a more detailed circuit diagram of a repeater station included in that system.

The construction of repeater station $400_i$, which is representative of all the repeater stations and possibly of an input stage of remote station 200 (in order to facilitate testing of even the most distant line segment by the operator at station 100), has been illustrated in FIG. 2 which shows the signal paths 301, 302 as two-wire lines with input transformers 303, 304 upstream of amplifiers $401_i$, $402_i$ and with output transformers 305, 306 downstream of these amplifiers. DC power is supplied to the amplifiers, and to the decoder $410_i$, from a remote source (e.g. at station 100) in known manner via a conductor 307 linking the midpoints of the primary of transformer 303 and the secondary of transformer 305, with interposition of a Zener diode 308 to establish a suitable voltage level for the operation of these circuits.

Decoder $410_i$ includes an eight-stage shift register 411 whose stage outputs feed an AND gate 412 working into an integrator 413 similar to integrator 132 of station 100. Switches $403_i$ (normally open) and $404_i$ (normally closed) are reversed whenever the integrator 413 is energized by a series of identification codes traversing the AND gate 412 whose inputs, as will be readily understood, are connected partly to the "one" outputs and partly to the "zero" outputs of the stages of register 411 in a pattern corresponding to an eight-digit code assigned to station $400_i$. Register 411, like register 120 at station 100, may be generally similar to a shift register 160 (FIG. 4) described hereinafter and forming part of the pulse generator 150. Again, the time constant of integrator 413 is so chosen that a switchover signal for electronic gates $403_i$ and $404_i$ is generated only if the identification code recurs a number of times (preferably not less than four) and at the rate of its generation by circuit 150 of station 100 (FIG. 1).

Shift register 411 receives its input from amplifier $401_i$ via a further transformer 414 which rectifies the incoming high-frequency carrier wave by means of diodes 415, 416 and develops the signal pulses across a resistor 417. Transformer 414 forms part of the loop closed through switch $403_i$, this loop also including an artificial line 418 duplicating the normal source impedance seen by amplifier $402_i$ when the latter is energized from transformer 304 by way of an impedance-matching network 309.

Figure 3:
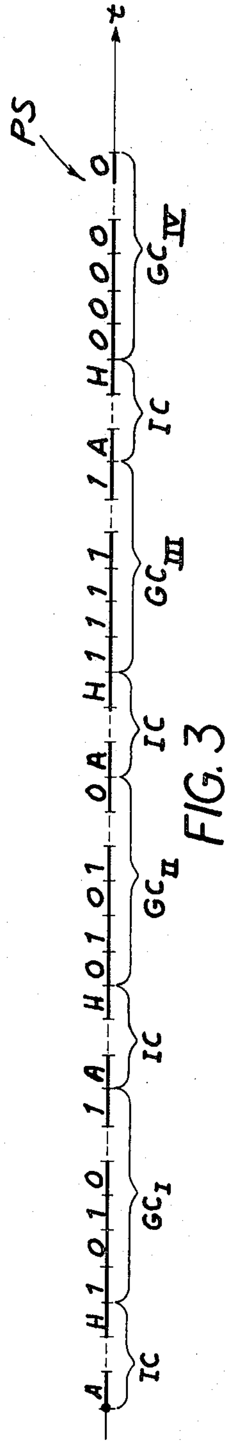
FIG. 3 is a schematic representation of a pulse sequence utilized in the system of FIG. 1.

In FIG. 3 we have illustrated a typical pulse sequence PS consisting of an identification code IC, repeated four times, and four guard codes $GC_I$, $GC_{II}$, $GC_{III}$, $GC_{IV}$ immediately following each occurrence of code IC. The identification code IC consists of eight bits A – H, corresponding to the similarly designated stages of shift registers 120 and 411, whereas the guard codes are composed of 65 bits each so that the entire pulse sequence PS consists of four 73-bit phases. Guard code $GC_I$ is an alternation of ones and zeros beginning and ending with a "1." Guard code $GC_{II}$ is a similar alternation, beginning and ending with a "0." Guard code $GC_{III}$ consists entirely of ones. Guard code $GC_{IV}$, finally, is a succession of zeros. The length of a phase is given as $n+p$ clock cycles where $p$=65 represents the number of bits per guard code.

Let us assume, by way of example, that a selected identification code assigned to, say, the repeater station $400_i$ has the form

11010010.

Since, depending on its position in the pulse sequence, this identification code may be immediately preceded and immediately followed by either a "0" or a "1," we may consider an extended code

X11010010Y where X and Y can have either value. This 10-digit series includes, apart from the original code, four eight-digit combinations

11101001

01101001

10100101

10100100 each occurring twice in a succession of four 73-digit phases. Thus, the first and the third of these combinations come into existence at the end and at the beginning, respectively, of each guard code ($GC_I$ and $GC_{III}$) starting and terminating with a "1;" the other two combinations appear at the beginning and at the end, respectively, of each guard code ($GC_{II}$ and $GC_{IV}$) starting and terminating with a "0." By excluding these four combinations from the identification codes actually assigned to respective repeater stations, we can eliminate a source of error inasmuch as any other possible eight-digit code combination will be found not more than once in a sequence of 292 bits. With eight-bit identification codes, taking into account the overlapping of exclusions, the number of different repeaters to be selectively addressed is a substantial fraction of the theoretical maximum of 256.

Figure 4:
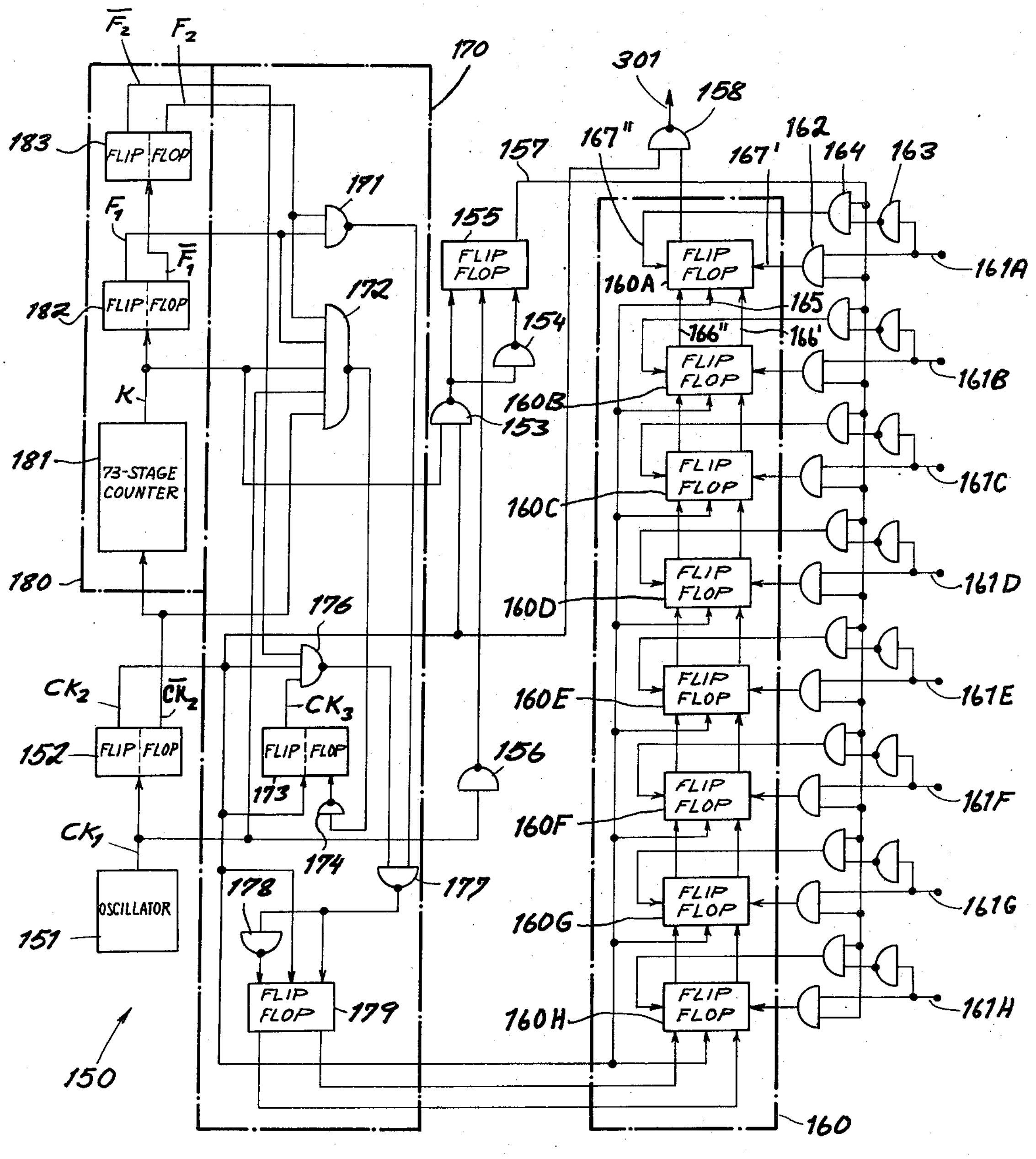
FIG. 4 is a logic diagram showing details of a pulse generator at a terminal station of the system of FIG. 1.

FIG. 4 shows details of the signal generator 150 including the aforementioned shift register 160 and a programmer generally designated 170. This pulse generator comprises an oscillator 151 emitting a train of primary clock pulses $CK_1$ which alternately set and reset a flip-flop 152 to generate secondary clock pulses $CK_2$, at half the frequency of pulses $CK_1$, along with their inversions $\overline{CK}_2$. Pulses $\overline{CK}_2$ are fed to a binary pulse counter 180 with a 73-stage section 181 and two further stages 182, 183 represented by respective flip-flops. Upon reaching its full count of 73 bits, counter section 181 emits a pulse K which trips the flip-flop 182 whose set and reset outputs are designated $F_1$ and $\overline{F}_1$, respectively. Upon resetting, flip-flop 182 similarly steps flip-flop 183 having a set output $F_2$ and a reset output $\overline{F}_2$.

Counting pulses K are also fed to a NAND gate 153 receiving the pulses $CK_2$ on its second input; the output of this NAND gate is transmitted directly to a resetting input and indirectly, by way of a further inverter 154, to a setting input of a bistable circuit 155. The later differs from the flip-flops 152, 182, 183 by being settable, in response to clock pulses $CK_1$ applied to its central switching input via an inverter 156, only if its setting input is energized by an output of inverter 154, i.e. if NAND gate 153 does not conduct. At other times, i.e. in the absence of a counting pulse K, this flip-flop is in its reset state.

Programmer 170 includes a NAND gate 171 receiving the outputs $F_1$ and $F_2$ from flip-flops 182 and 183, another NAND gate 172 with five inputs connected to receive pulses $CK_1$, $\overline{CK}_2$, K, $F_1$ and $F_2$, a flip-flop 173 normally generating a ternary clock pulse $CK_3$ on its set output for every two secondary clock pulses $CK_2$ applied to its main input, an inverter 174 inserted between a resetting input of this flip-flop and the output of NAND gate 172, and two further NAND gates 176, 177 as well as an inverter 178 connected to the control inputs of a flip-flop 179 similar to bistable circuit 155. NAND gate 176 has three inputs, respectively receiving the pulses $\overline{F}_2$, $CK_2$ and $CK_3$, and is connected in cascade with NAND gate 177 to the two control inputs of flip-flop 179, one of these input connections including the inverter 178. The output of NAND gate 171 is supplied to the second input of NAND gate 177.

Shift register 160 has eight stages, in the form of flip-flops generally similar to bistable circuits 155 and 179, which have been designated 160A – 160H and are controlled by leads 161A – 161H originating at the several stages of selector switch 110, FIG. 1, designated A – H. As particularly indicated for the first stage 160A, each of these flip-flops has a switching input 165 receiving the clock pulses $CK_2$, a first pair of control inputs 166', 166'' connected to corresponding outputs of the preceding stage (or of flip-flop 179 in the case of the entrance stage 160H), and a second pair of control inputs 167', 167'' which, when energized, override the potentials on inputs 166' and 166'' to set or reset the flip-flop upon occurrence of the next switching pulse. Input 167' is connected to the corresponding selector lead, such as 161A, through an AND gate 162 also tied to a conductor 157 originating at the set output of flip-flop 155. The same input lead is connected through an inverter 163 and another AND gate 164 to the control input 167'', AND gate 164 being likewise energized by the set output of flip-flop 155 via conductor 157. Finally, an output of flip-flop 160A is connected to outgoing line 301 by way of a NAND gate 158 having another input connected to flip-flop 152 for receiving the clock pulses $CK_2$.

Figure 5:
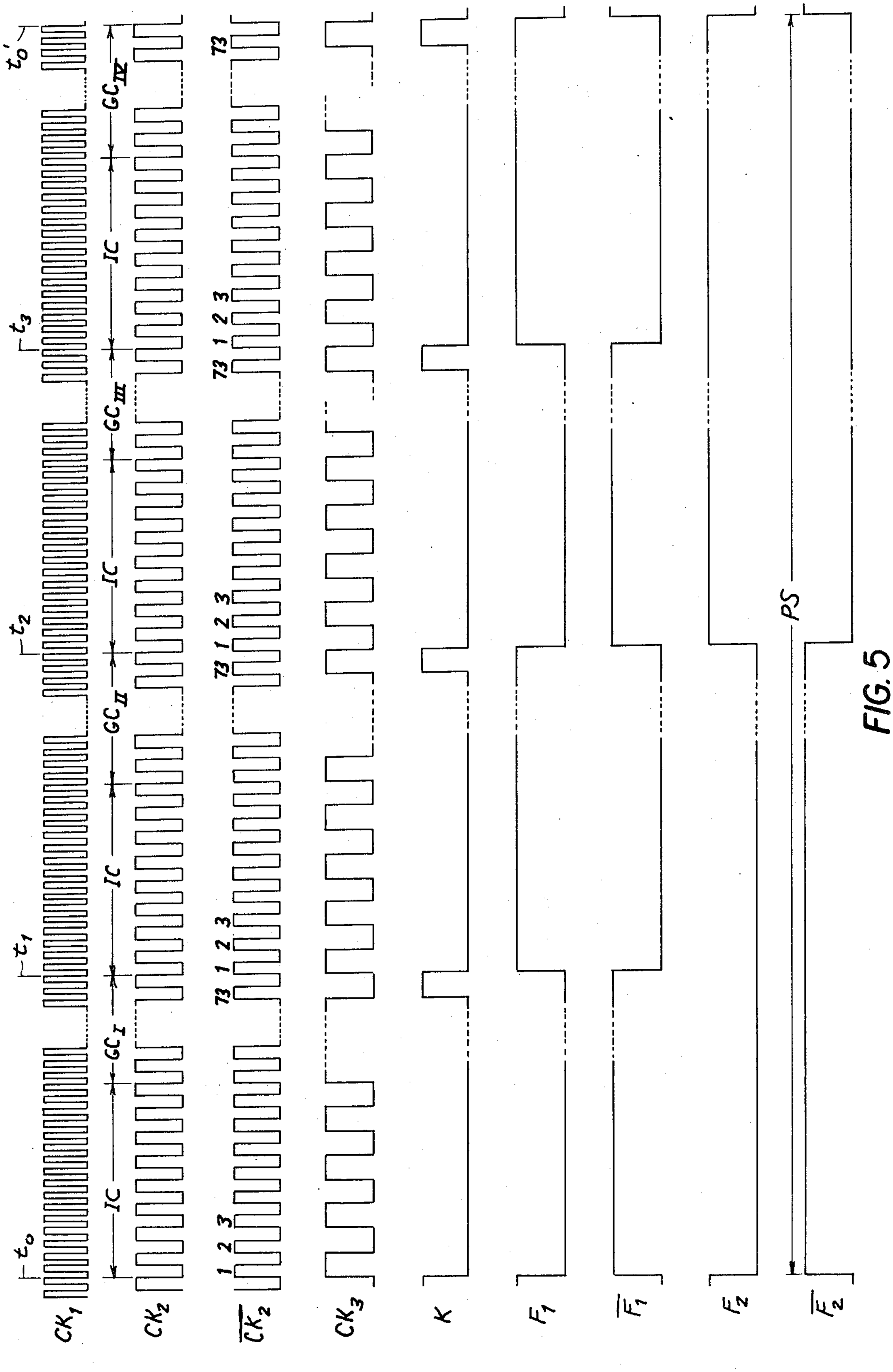
FIG. 5 is a set of graphs relating to the operation of the pulse generator of FIG. 4.

The operation of the pulse generator of FIG. 4 will now be described with reference to FIG. 5 which shows the pulse trains $CK_1$, $CK_2$, $\overline{CK}_2$ $CK_3$,K,$F_1$, $\overline{F}_1$, $F_2$ occurring during one pulse sequence PS of 292 bits, each bit being represented by a timing pulse $CK_2$ which unblocks the gate 158 for the passage of a digit "0" or "1." The secondary clock pulses $CK_2$ and $\overline{CK}_2$ are coming into existence on the trailing edges of clock pulses $CK_1$, with generation of the ternary clock pulses $CK_3$ on the trailing edges of secondary pulses $CK_2$. The first eight clock cycles $CK_2$, starting at a time $t_0$, coincide with the generation of the first identification code IC, which is followed during the next 65 clock pulses by the guard code $GC_I$; in like manner, the recurrences of identification code IC at times $t_1$, $t_2$, $t_3$ alternate with the three other guard codes $GC_{II}$, $GC_{III}$ and $GC_{IV}$.

Counting pulse K, which is generated by the 73rd clock pulse $\overline{CK}_2$ of each cycle, marks the reversal of flip-flop 812 and also causes brief energization of conductor 157 in the presence of a clock pulse $CK_2$, thus setting the flip-flops of register 160 in accordance with the selected identification code preparatorily to the read-out of that code during the following 8 clock cycles.

During the first phase of pulse sequence PS, from time $t_o$ to time $t_1$, flip-flops 182 and 183 are reset so that NAND gate 171 has a true output, making the NAND gate 177 switchable according to the output of NAND gate 176 which is also switchable in the presence of signal $\overline{F}_2$ by the concurrence of pulses $CK_2$ and $CK_3$. Thus, flip-flop 179 is alternately set and reset during successive clock pulses $CK_2$, thereby feeding the entrance stage 160H of register 160 with an alternation of ones and zeros (starting with a "1" in accordance with guard code $GC_I$). In the second phase, lasting from time $t_1$ to time $t_2$, flip-flop 182 is set but the alternate feeding of ones and zeros to register 160 continues so that the second guard code $GC_{II}$ is read out to the line 301 after the first eight pulses $CK_2$ allocated to the second occurrence of the identification code IC. In the third phase, starting at instant $t_2$, flip-flop 182 is reset and flip-flop 183 is set so that NAND gate 176 becomes unswitchable and produces a permanent true output, NAND gate 177 being therefore cut off to energize, via inverter 178, one of the control inputs of flip-flop 179 resulting in the continuous generation of bits "1" appearing on line 301, in accordance with guard code $GC_{III}$, as soon as the third transmission of identification code IC has been terminated. Finally, at time $t_3$, the simultaneous presence of signals $F_1$ and $F_2$ blocks the NAND gate 171 so that NAND gate 177 begins to conduct without interruption, thereby reversing the flip-flop 179 and generating an unbroken succession of zeros on line 301 (according to guard code $GC_{IV}$) after the fourth occurrence of identification code IC.

Just before the sequence is recommenced at time $t_0'$, the coincidence of clock pulses $CK_1$, $\overline{CK}_2$ with a counting pulse K and flip-flop outputs $F_1$, $F_2$ resets the flip-flop 173 by way of NAND gate 172 and inverter 174 to resynchronize that flip-flop with the remainder of the circuit, thereby restoring the condition that existed at time $t_0$.

We claim:

1. In a pulse-code-modulation telecommunication system including a two-way transmission channel with a pair of signal paths extending from a local station to a remote station and with a multiplicity of intervening repeater stations in series each provided with amplifier means in said path, the combination therewith of:

pulse-generating means including a multidigit selector at said local station for establishing a multiplicity of different identification codes of $n$ bits each, n being an integer greater than 1, assigned to respective repeater stations and for iteratively transmitting a predetermined sequence of bits over one path of said channel, said sequence including one of said identification codes individual to a selected repeater station, said pulse-generating means further including a programmer controlled by said selector for repeating each identification code several times in said sequence with intervening multidigit guard codes of periodic character having a low-order periodicity with a recurrence period of m bits where m is substantially smaller than $n$;

decoding means at said repeater station connected to said one path for picking up said identification code;

switch means at said repeater station responsive to recognition of said identification code by said decoding means for completing a loop through said amplifier means back to said local station by way of the other path of said channel and for feeding back a recurrence of said sequence via said loop;

detector means at said local station connected to said other path for receiving and recognizing said identification code, said detector means being coupled to said selector for registration of a replica of the transmitted code;

and signaling means controlled by said detector means for indicating the closure of said loop.

2. The combination defined in claim 1 wherein said programmer includes circuitry for alternating between a predetermined number of mutually different but individually invariable guard codes in a fixed order within said sequence.

3. The combination defined in claim 2 wherein said decoding means comprises an integrating circuit responsive to a multiplicity of recurrences of said identification code at the rate of recurrence thereof in said sequence.

4. The combination defined in claim 3 wherein said decoding means comprises an $n$-stage shift register and a coincidence gate with $n$ inputs respectively connected to the stages of said shift register, said integrating circuit being connected to receive the output of said coincidence gate.

5. The combination defined in claim 2 wherein said detector means comprises an $n$-stage comparison network settable by said selector and a shift register with n stages having output connections to said network.

6. The combination defined in claim 5 wherein said detector means further comprises a coincidence gate with n inputs respectively connected to the stages of said shift register and an integrating circuit inserted between said coincidence gate and said signaling means for actuating the latter only in response to a multiplicity of recurrences of said identification code at the rate of recurrence thereof in said sequence.

7. The combination defined in claim 1 wherein said programmer comprises a source of clock pulses, a counter for said clock pulses with $n+p$ stages where p is substantially greater than n, an n-stage shift register with input connections to the stages thereof energizable by said selector, and logical circuitry jointly controlled by said source and said counter for periodically stepping said stages, said circuitry including blocking means for disabling said input connections upon said counter registering a pulse count other than $n+p$.

8. The combination defined in claim 7 wherein said circuitry further includes switchover means inserted between said source and a first one of said stages for alternately feeding 0's and 1's thereto in the disabled condition of said input circuitry, and binary means settable in certain counting cycles of each sequence for inhibiting said switchover means.

9. The combination defined in claim 2 wherein $m=2$ and the number of said mutually different guard codes equals 4.

* * * * *

PO-1050
(5/69)

UNITED STATES PATENT OFFICE
CERTIFICATE OF CORRECTION

Patent No. 3,692,964 Dated 19 September 1972

Inventor(s) Roberto CAMICIOTTOLI ET AL

It is certified that error appears in the above-identified patent and that said Letters Patent are hereby corrected as shown below:

For the name of the Assignee at line 73 of the heading read --Societa Italiana Telecomunicazione Siemens S.p.A.--

Signed and sealed this 9th day of July 1974.

(SEAL)
Attest:

McCOY M. GIBSON, JR.
Attesting Officer

C. MARSHALL DANN
Commissioner of Patents